United States Patent Office 3,557,072
Patented Jan. 19, 1971

3,557,072
PLASTOMERS DERIVED FROM DIMETHANO-OCTAHYDRONAPHTHALENE AND THEIR METHOD OF MANUFACTURE
Jean Vergne, Claude Pailloux, Jean-Claude Muller, and Jean-Claude Robinet, Verneuil-en-Halatte, Oise, France, assignors to Charbonnages de France, Paris, France, a public institution of France
No Drawing. Filed Jan. 10, 1968, Ser. No. 696,719
Claims priority, application France, Jan. 12, 1967, 90,915
Int. Cl. C08f *5/00, 17/00*
U.S. Cl. 260—88.2
30 Claims

ABSTRACT OF THE DISCLOSURE

The invention concerns new plastomer polymers obtained by polymerisation of at least one new monomer of the group of dimethanooctahydronaphthalene and its alkyl derivatives (obtained by reaction of an aliphatic olefin with cyclopentadiene) with from 0 to 99% of a compound of the group of styrene, acenaphthylene and cyclic olefins, in the presence of a catalyst comprising a salt of ruthenium, rhodium, palladium, osmium, iridium, platinum in association with an alcohol or a salt of titanium, vanadium, zirconium, tungsten, molybdenum in association with a compound having a metal-hydrocarbon or metal-hydrogen bond.

---

The present invention relates to new plastomers derived from dimethanooctahydronaphthalene, called in the remainder of this text by the abbreviation "DMON," and certain of its alkyl derivatives. The invention is more particularly concerned with the macro-molecular compounds of this class, the structural formula of which includes at least one unit of the formula

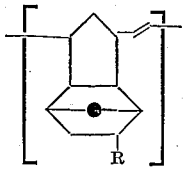

in which R represents hydrogen or a lower alkyl group.

The present invention also covers the methods of manufacture of these plastomers and also, as new industrial products, certain of the intermediate or starting products from which these plastomers are obtained and the methods of preparation of these intermediates or starting products; the present invention also covers the above macro-molecular compounds modified by the introduction of a unit derived from an olefin compound.

The products according to the invention are of special advantage in the usual field of application of plastomers, in that they have impact resistance, glass-transition temperatures, thermal stability and tensile strength at break which are sufficiently-high to make them sought for in the case where the combination of these characteristics or one of them is desired.

Thus, the plastomers of the invention which in particular only comprise the above formula units (polymers of dimethanooctahydronaphthalene or of certain of its alkyl derivatives) present the exceptional property in the field of plastomers, of having a glass transition temperature generally higher than 150° C., and frequently of the order of 200° C. In addition, these polymers have very advantageous breaking strength at high temperatures, which permits their application to be envisaged at temperatures higher than 150° C. They have furthermore a good impact resistance over a large range of temperatures, and this resistance remains practically constant down to very low temperatures, which renders the utilization of these polymers possible over a range of temperatures from about −200° C. to about +100° C.

In the case where a less-high glass-transition temperature may be acceptable, recourse may be had to the compounds of the invention modified for example by a copolymerizable compound such as for example an ethylenic-unsaturated compound such as bicyclo[2.2.1]-hept-2-ene and its alkyl derivatives, styrene and the cyclic olefins. Such modified plastomers may be moulded at lower temperatures than the non-modified plastomers.

The method of production of the modified polymers and polymers hereinafter called as co-polymers of dimethano-octahydronaphthalene and its derivatives, consists of subjecting the starting product or products to a so-called polymerization reaction in the presence of appropriate catalysts known for the polymerization of cyclic olefins. There may be cited for this purpose the salts of noble metals such as ruthenium rhodium, palladium, osmium, iridium and platinum, halides, nitrates, acetylacetonates in association with a reducing agent such as an alcohol, ruthenium chloride being the preferred catalyst, or alternatively a compound of a transition metal of Groups IV, V and VI of the Periodic Table of elements, such as for example titanium, vanadium, zirconium, tungsten, molybdenum, in association with compounds containing at least one metal-hydrocarbon or metal-hydrogen bond.

According to the catalysts and the operating conditions applied for their preparation, the compounds of the invention have a structure which is amorphous or which has more or less high crystallinity. The compounds with an amorphous structure are transparent, which permits of their application in the case where this property is desirable.

Other characteristic features and advantages of the invention will become more clearly apparent from the description which follows below with reference to the following illustrative examples given without any limitative sense and showing on the one hand the methods of preparation of the starting products and, on the other hand, the method of production of the polymers and modified polymers or copolymers. As will be seen, certain of these starting products are new in themselves, and the present invention covers them as such as industrial products utilized in organic synthesis.

(I) PREPARATION OF MONOMERS 1,4,5,8-dimethano-1,2,3,4,4a,5,8,8a-octahydro-naphthalene (DMON)

The DMON is obtained by condensing bicyclo [2.2.1]-hept-2-ene (norbornene) with cyclopentadiene, following the reaction:

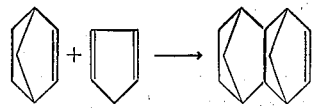

*Example.*—In an autoclave of 330 ml. with magnetic stirring, there are introduced at ambient temperature 51 grams of norbornene and 39 grams of dicyclo-pentadiene of commercial grade under a pressure of nitrogen of 1.5 bars. While stirring, the temperature is increased in four hours up to 160° C. and this temperature is maintained for twelve hours. After cooling, there is obtained a liquid the analysis of which by gas-liquid chromotography shows that it contains:
(1) 27.95% by weight of DMON (yield based on the norbornene introduced = 25.1%).

(2) 36.32% by weight of norbornene; 26.67% by weight of dicyclo-pentadiene and 0.43% by weight of cyclopentadiene; these three products can be recycled.
(3) 8.63% by weight of secondary products.

The following table gives the results obtained by varying certain conditions. The yields are calculated with respect to the reactant which is in minor proportion, that is to say to the norbornene, except in the tests Nos. 12, 14, 15 and 16, in which they are given with respect to the cyclo-pentadiene.

| Test No. | Weight of norbornene introduced (in grams) | Weight of dicyclo-pentadiene introduced (in grams) | Initial nitrogen pressure (in bars) | Reaction temperature, °C. | Duration of reaction (in hours) | Percent by weight of DMON | Yield of DMON (in percent) | Percent by weight of— | | | |
|---|---|---|---|---|---|---|---|---|---|---|---|
| | | | | | | | | Cyclo-pentadiene | Norbornene | Dicyclo-pentadiene | Secondary products |
| 1 | 51 | 39 | 1.5 | 160 | 12 | 27.95 | 25.1 | 0.43 | 36.32 | 26.67 | 8.63 |
| 2 | 76.5 | 58.5 | 30 | 160 | 12 | 28.74 | 29.8 | | 36.54 | 19.24 | 15.48 |
| 3 | 76 | 58 | 100 | 160 | 12 | 28.93 | 30 | | 37.76 | 17.11 | 16.20 |
| 4 | 76.5 | 58 | 175 | 160 | 12 | 20.64 | 21.4 | 0.71 | 27.60 | 43.70 | 7.35 |
| 5 | 76 | 58 | 5 | 180 | 12 | 51.30 | 53.2 | | 16.03 | 4.2 | 28.40 |
| 6 | 76 | 58 | 100 | 180 | 12 | 41.3 | 42.8 | 0.20 | 29.36 | 5.13 | 24.01 |
| 7 | 76 | 58 | 5 | 200 | 12 | 48.3 | 50 | | 21.9 | 1.95 | 27.85 |
| 8 | 76 | 58 | 100 | 200 | 12 | 49.41 | 51.2 | 0.10 | 25.7 | 2.14 | 22.65 |
| 9 | 76 | 58 | 5 | 250 | 12 | 28.93 | 32 | | 36.69 | 1.31 | 33.07 |
| 10 | 76.5 | 58 | 100 | 250 | 12 | 25.85 | 26.8 | | 0.61 | 1.43 | 72.11 |
| 11 | 76.5 | 58 | 5 | 180 | 12 | 44.82 | 46.5 | 0.23 | 40.43 | 2.25 | 12.27 |
| 12 | 76 | 26.6 | 8 | 180 | 12 | 45.45 | 72.7 | 0.33 | 48.35 | 1.02 | 4.85 |
| 13 | 76 | 79.5 | 5 | 180 | 12 | 46.86 | 57.6 | 0.08 | 33.20 | 3.40 | 16.46 |
| 14 | 76 | 17.9 | 5 | 180 | 12 | 30.18 | 65.7 | 0.08 | 63.6 | 1.05 | 5.09 |
| 15 | 76.5 | 13.5 | 5 | 180 | 12 | 34.50 | 67.5 | 0.10 | 59.2 | 0.60 | 15.6 |
| 16 | 76 | 10.7 | 5 | 180 | 12 | 28.30 | 95.2 | 0.05 | 67.10 | 0.54 | 4.01 |

Purification of the DMON

The liquid passing out of the autoclave is fractionated by distillation in a packed column. The distillation is first carried out at atmospheric pressure in order to eliminate the heads and to recover the norbornene (B.P.$_{760}$=92–94° C.) by limiting the temperature of the boiler to 130° C. in order to avoid cracking the dicyclo-pentadiene. A distillation is then carried out under reduced pressure in order to obtain the DMON (B.P.$_{10}$=92–96° C.). The DMON can be distilled several times, depending on the purity desired.

3-methyl 1,4,5,8-dimethano-1,2,3,4,4a,5,8,8a-octahydronaphthalene (in abbreviation methyl DMON)

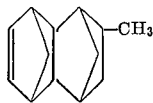

The methyl DMON was obtained by the Diels-Alder synthesis from propylene and cyclo-pentadiene.

The optimum yield at 250° C. is about 20% after heating to 250° C. for 5 hours, the molar ratio of propylene to cyclo-pentadiene being of about 1:1.

Example.—In an autoclave of 0.865 litre charged with 284 grams of commercial propylene, there are introduced 325 grams of commercial dicyclo-pentadiene. The mixture is heated for 5 hours at a rate of the order of 50° C. per hour so as to reach 250° C., while stirring, and is maintained at 250° C. for 5 hours under stirring. After cooling, there are obtained 414 grams of liquid, which corresponds to a consumption of 115 grams of propylene. The gas-liquid chromatography analysis of this liquid shows that it contains 60.5% of 5-methylbicyclo[2.2.1]-hept-2-ene and 19.8% of methyl-DMON.

The product of this synthesis is distilled in a packet column. At atmospheric pressure there are obtained on the one hand light products and on the other hand 5-methylbicyclo[2.2.1]-hept-2-ene (B.P.$_{760}$=114–116° C.); the heavy fraction remaining in the boiler is distilled under reduced pressure, which gives a fraction rich in methyl-DMON (B.P.$_{7}$=75–100° C.) which is purified by repeated distillations until the desired content is obtained.

The methylbicycloheptene can be condensed with cyclopentadiene under the conditions described for the synthesis of DMON, in order to obtain methyl-DMON. With a molar ratio of methylbicycloheptene/cyclo-pentadiene (in the form of dicyclopentadiene) of 4/1, methyl-DMON is obtained after heating to 200° C. for 6 hours with a yield of 95%.

The methyl-DMON is obtained in the form of a colourless liquid, the refractive index $n_D^{21}$ of which is equal to 1.517. Examination with the mass spectrometer of high resolving power (MS 9 of A.E.I.) confirms the molecular mass of 174 and the crude formula. Its analysis corresponds exactly to the formula $C_{13}H_{18}$. Its infra-red spectrum has the following main bands: 3060 cm.$^{-1}$; 1475 and 1450 cm.$^{-1}$; 1375 cm.$^{-1}$; a group of bands in the region of 750–725 cm.$^{-1}$; and 700 cm.$^{-1}$.

Other mono-substituted DMONs can be obtained in the same manner. Thus, for example, butyl DMON can be obtained either by the Diels-Alder synthesis directly from 5-butylbicyclo[2.2.1]-hept-2-ene and from cyclo-pentadiene, or by indirect Diels-Alder synthesis from 1-hexene and cyclo-pentadiene, giving 5-butylbicyclo[2.2.1]-hept-2-ene and butyl-DMON. An example of this method of preparation will be given below.

An autoclave of 0.865 litre is charged with 119 grams of 1-hexene and 31 grams of dicyclo-pentadiene. The heating is carried out for 5 hours to 250° C. After cooling, 147 grams of liquid are obtained comprising, according to the gas-liquid chromatographic analysis, 16.4% of 5-butylbicyclo[2.2.1]-hept-2-ene and 5.4% of butyl-DMON. This liquid is fractionated by distillation: from the fraction having B.P.=53–54° C./7 torr, pure butyl-DMON is obtained by preparative chromatography.

In this way also, isobutyl-DMON can be obtained in the same way as butyl-DMON, either by direct Diels-Alder synthesis from 5-isobutyl-bicyclo[2.2.1] hept-2-ene and cyclo-pentadiene, or by indirect Diels-Alder synthesis from 4-methyl-1-pentene and cyclo-pentadiene, giving 5-isobutylbicyclo [2.2.1]-hept-2-ene and isobutyl-DMON. In order to do this, the operation is carried out under the same conditions as for the preparation of butyl-DMON, that is to say an autoclave of 0.865 litre is charged with 119 grams of 4-methyl-1-pentene and 31 grams of dicyclo-pentadiene. The mixture is heated to 250° C. in 5 hours. After cooling, there are obtained 147 grams of liquid containing, according to the gas-liquid chromatographic analysis, 29.5% of 5-isobutylbicyclo[2.2.1]-hept-2-ene and 5.6% of isobutyl-DMON. This liquid is fractionated by distillation: from the fraction with B.P.=135–127° C./11 torr, purified isobutyl-DMON is obtained by preparative chromatography.

(II) PREPARATION OF POLYMERS AND COPOLYMERS

For these polymerizations and co-polymerizations, the monomers are employed, the preparation and purification of which have been described above. There are preferably utilized products in which the content of cyclo-pentadiene and/or of homo-condensation products of cyclo-pentadiene is made as small as possible.

Polydimethano-octahydro-naphthalene (poly-DMON)

*Example 1.*—A solution of DMON of 4 mols per litre is prepared in a solvent together with a solution of hydrated ruthenium chloride ($RuCl_3.3H_2O$) at $10^{-2}$ mol per litre in an alcohol.

In an ampulla there are mixed 5 ml. of the monomer solution and the volume of catalyst solution, listed in following table. After having been degasified under vacuum by successive melting and congelation and sealed, this ampulla is placed in a bath thermostatically controlled to the desired temperature. After polymerization, the ampulla is broken and the polymer, which is obtained in the form of a hard white mass is washed with methanol by means of a turbo-grinder and dried. A white powder is thus obtained.

The following table gives the different results obtained. The best yields are obtained for examples carried out at temperatures equal to or higher than 90° C. In any case however, the polymers according to the invention are obtained over a wide range of temperature and ratio of catalyst/monomer. The molecular mass of the polymers, determined by light scattering varies between $2.10^5$ and $2.10^6$.

| | Monomer | | Catalyst | | | | | |
|---|---|---|---|---|---|---|---|---|
| | Purity (in percent) | Solvent | Solvent | Volume of solution utilized (in ml.) | Temperature of polymerization (in ° C.) | Duration of polymerization (in hours) | Weight of polymer (in grams) | Yield in polymer (in percent) |
| Test No.: | | | | | | | | |
| 1 | 94.63 | Benzene | Methanol | 0.5 | 60 | 1 | 0.0835 | 2.76 |
| 2 | 94.63 | do | do | 0.5 | 60 | 2 | 0.1497 | 4.95 |
| 3 | 94.63 | do | do | 0.5 | 60 | 3 | 0.2388 | 7.90 |
| 4 | 94.63 | do | do | 0.5 | 60 | 4 | 0.3229 | 10.69 |
| 5 | 94.63 | do | do | 0.5 | 60 | 5 | 0.3641 | 12.05 |
| 6 | 94.63 | n-Butanol | n-Butanol | 0.5 | 60 | 1 | 0.1943 | 6.43 |
| 7 | 94.63 | do | do | 0.5 | 60 | 2 | 0.2401 | 7.95 |
| 8 | 94.63 | do | do | 0.5 | 60 | 3 | 0.3149 | 10.42 |
| 9 | 94.63 | do | do | 0.5 | 60 | 4 | 0.3868 | 12.80 |
| 10 | 94.63 | do | do | 0.5 | 60 | 6 | 0.4903 | 16.23 |
| 11 | 94.63 | do | do | 0.5 | 60 | 18 | 0.4330 | 14.33 |
| 12 | 94.63 | do | do | 0.5 | 60 | 24 | 0.354 | 11.72 |
| 13 | 94.63 | do | do | 0.5 | 70 | 1 | 0.360 | 11.92 |
| 14 | 94.63 | do | do | 0.5 | 70 | 2 | 0.368 | 18.80 |
| 15 | 94.63 | do | do | 0.5 | 70 | 3 | 0.550 | 18.21 |
| 16 | 94.63 | do | do | 0.5 | 70 | 18 | 0.747 | 24.73 |
| 17 | 94.63 | do | do | 0.5 | 70 | 24 | 0.5767 | 19.09 |
| 18 | 96.66 | do | do | 2 | 70 | 1 | 1.39 | 44.98 |
| 19 | 96.66 | do | do | 2 | 70 | 2 | 2.04 | 66.02 |
| 20 | 96.66 | do | do | 2 | 70 | 3 | 2.30 | 74.43 |
| 21 | 96.66 | do | do | 2 | 70 | 4 | 2.35 | 76.05 |
| 22 | 96.66 | do | do | 2 | 70 | 5 | 2.18 | 70.55 |
| 23 | 92.80 | do | do | 0.5 | 80 | 1 | 0.4 | 13.47 |
| 24 | 92.80 | do | do | 0.5 | 80 | 2 | 0.87 | 29.29 |
| 25 | 92.80 | do | do | 0.5 | 80 | 3 | 0.7 | 23.57 |
| 26 | 92.80 | do | do | 0.5 | 80 | 4 | 0.95 | 31.98 |
| 27 | 92.80 | do | do | 0.5 | 80 | 5 | 0.85 | 28.62 |
| 28 | 96.66 | do | do | 2 | 80 | 1 | 2.15 | 69.58 |
| 29 | 96.66 | do | do | 2 | 80 | 2 | 2.15 | 69.58 |
| 30 | 96.66 | do | do | 2 | 80 | 3 | 2.30 | 74.43 |
| 31 | 96.66 | do | do | 2 | 80 | 4 | 2.36 | 76.37 |
| 32 | 96.66 | do | do | 2 | 80 | 5 | 2.27 | 73.46 |
| 33 | 94.63 | do | do | 0.5 | 90 | 1 | 0.70 | 23.10 |
| 34 | 94.63 | do | do | 0.5 | 90 | 2 | 0.60 | 19.80 |
| 35 | 94.63 | do | do | 0.5 | 90 | 3 | 0.82 | 27.00 |
| 36 | 94.63 | do | do | 0.5 | 90 | 4 | 0.64 | 21.12 |
| 37 | 96.66 | do | do | 0.5 | 90 | 15 | 0.92 | 29.7 |
| 38 | 96.66 | do | do | 0.5 | 90 | 18 | 0.83 | 26.86 |
| 39 | 96.66 | do | do | 0.5 | 90 | 24 | 0.75 | 24.27 |
| 40 | 96.66 | do | do | 0.5 | 90 | 1 | 1.89 | 61.16 |
| 41 | 96.66 | do | do | 0.5 | 90 | 3 | 1.87 | 60.51 |
| 42 | 96.66 | do | do | 0.5 | 90 | 4 | 1.87 | 60.51 |
| 43 | 96.66 | do | do | 0.5 | 90 | 24 | 1.82 | 58.9 |
| 44 | 95 | do | do | 1.5 | 90 | 1 | 2.4 | 78.94 |
| 45 | 95 | do | do | 1.5 | 90 | 2 | 2.44 | 80.26 |
| 46 | 95 | do | do | 1.5 | 90 | 3 | 2.43 | 79.93 |
| 47 | 95 | do | do | 1.5 | 90 | 4 | 2.40 | 78.94 |
| 48 | 95 | do | do | 1.5 | 90 | 5 | 2.46 | 80.92 |
| 49 | 96.66 | do | do | 2 | 90 | 1 | 2.64 | 85.43 |
| 50 | 96.66 | do | do | 2 | 90 | 2 | 2.82 | 91.26 |
| 51 | 96.66 | do | do | 2 | 90 | 3 | 2.76 | 89.32 |
| 52 | 96.66 | do | do | 2 | 90 | 4 | 2.59 | 83.81 |
| 53 | 96.66 | do | do | 2 | 90 | 5 | 2.84 | 91.91 |
| 54 | 95 | do | do | 2 | 90 | 18 | 2.66 | 87.5 |
| 55 | 88.66 | do | do | 2.5 | 90 | 1 | 2.50 | 88 |
| 56 | 88.66 | do | do | 2.5 | 90 | 2 | 2.50 | 88 |
| 57 | 88.66 | do | do | 2.5 | 90 | 3 | 2.47 | 86.97 |
| 58 | 88.66 | do | do | 2.5 | 90 | 4 | 2.55 | 89.85 |
| 59 | 88.66 | do | do | 2.5 | 90 | 5 | 2.60 | 91.54 |
| 60 | 99.23 | do | do | 2 | 100 | 1 | 2.72 | 85.66 |
| 61 | 99.23 | do | do | 2 | 100 | 2 | 3.02 | 95.12 |
| 62 | 99.23 | do | do | 2 | 100 | 3 | 2.80 | 88.19 |
| 63 | 99.23 | do | do | 2 | 100 | 4 | 2.88 | 90.71 |
| 64 | 99.23 | do | do | 2 | 100 | 5 | 2.81 | 88.50 |

All the polymers obtained in this example are amorphous, as determined by examination by diffraction with X-rays and by differential thermal analysis. This latter determination is carried out using a "Du Pont 900" apparatus. The glass transition temperature of these polymers is comprised between 190 and 205° C.

*Example 2.*—In an ampulla there are mixed 50 ml. of a solution of DMON (purity 95%) at 4 mols per litre in butanol, and 20 ml. of a solution of hydrated ruthenium chloride at $10^{-2}$ mols per litre in butanol.

After having been degasified under vacuum by successive melting and congelation and sealed, this ampulla is placed in a bath thermostatically controlled to 90° C. for 3 hours.

After polymerization, the ampulla is broken and the polymer is washed with methanol, by means of a turbo-grinder, and is then dried.

There are obtained 25.5 grams of polymer (yield=83.8% molecular mass=$2.10^5$–$2.10^6$) which is amorphous as observed by diffraction with X-rays and by differential thermal analysis. This latter determination is carried out on the "Du Pont 900" apparatus. The glass transition temperature of the polymer is 200–205° C. Its infrared spectrum has in particular a group of bands towards 1480–60 cm.$^{-1}$, intense bands at 1440 cm.$^{-1}$ and 970 cm.$^{-1}$ and weaker bands at 750 cm.$^{-1}$ and 880 cm.$^{-1}$, thus enabling the structure formula of the unit to be established.

This polymer is moulded by compression at a temperature of 270° C. to a transparent plate of 1 mm. in thickness, on which the following mechanical properties are determined, according to ASTM D 638.

|  | Modulus (kg./mm.$^2$) | Tensile strength at break (kg./mm.$^2$) | Impact resistance* (kg.cm./cm.$^2$) |
|---|---|---|---|
| At 20° C | 130 | 8.2 | 40 |
| At 60° C | 120 | 7.5 |  |
| At 100° C | 100 | 5.0 | 56 |
| At −196° C |  |  | 35 |

* This impact resistance was determined according to ASTM D 256 so-called Charpy test, modified in the following manner: the test sample of 70 x 10 x 5 mm. rests on supports spaced apart by 50 mm.; the speed of impact is 1 m./sec.

In view of this group of physical and mechanical properties, polymers of this kind are of value in a large number of industrial applications in which such properties are desirable, as for example the manufacture of transparent casings for electrical apparatus, gears and all mechanical parts intended to operate especially at very low temperatures.

*Example 3.*—In a reactor swept out with nitrogen, provided with a turbo-stirrer and kept at 100° C., there are mixed 80 grams of DMON (purity 98.96%), 1 litre of n-butanol and 50 ml. of a solution at $10^{-2}$ mol per litre of hydrated ruthenium chloride in n-butanol. This is left under stirring for 3 hours. There are thus obtained 48 grams of a polymer in powder which is washed with methanol and dried under vacuum (yield=60%). The molecular mass, determined by light scattering is comprised between $2.10^5$ and $2.10^6$. The glass transition point is of the order of 205° C. Its physical properties and its applications are similar to those of the product of the previous example.

*Example 4.*—The operations are carried out as in the previous example, but there are utilized 80 grams of DMON (purity 99.28%), 820 ml. of n-butanol and 100 ml. of a solution at $0.5.10^{-2}$ mol per litre of hydrated ruthenium chloride in n-butanol. This is left under stirring for 5 hours. There are thus obtained 63.5 grams of a polymer in powder which is washed with methanol and dried under vacuum (yield=80%; molecular mass=$2.10^5$–$2.10^6$).

*Example 5.*—The operations are carried out as in Example 2, the purity of the monomer being 96.8%. There are obtained 26.4 grams of polymer (yield=85.2%). The polymer is moulded as indicated above, after which its mechanical properties are determined.

|  | Modulus (kg./mm.$^2$) | Tensile strength at break (kg./mm.$^2$) |
|---|---|---|
| At 20° C | 160 | 7 |
| At 100° C | 110 | 4.2 |
| At 150° C | 90 | 2.1 |
| At 175° C | 40 | 0.7 |

As for the polymer of Example 2, the impact resistance varies very little between the ambient temperature and about −200° C.

*Example 6.*—The operations are carried out as in Example 1, by utilizing 12 ampullae, each containing 5 ml. of a solution at 5 mols per litre of DMON at 95% purity in butanol, and 2 ml. of the catalyst solution. This mixture is heated to 90° C. for 3 hours. After washing and drying, the polymer is obtained with yields comprised between 79 and 85%.

These polymers which have a glass transition temperature of 200–205° C. are mixed and are then moulded by compression in plates of 1 and 3 mm. in thickness, at temperatures of 240 and 300° C., on which the mechanical properties are determined.

|  | Modulus (kg./mm.$^2$) | Tensile strength at break (kg./mm.$^2$) |
|---|---|---|
| At 20° C | 157 | 8.9 |
| At 60° C | 140 | 7.2 |
| At 100° C | 108 | 5.0 |
| At 140° C | 72 | 3 |
| At 180° C | 6.4 | 0.5 |

Vicate temperature: 178° C.

Volume resistivity: greater than $10^{15}$ Ω cu. cm.

The impact resistance of these polymers and their applications are substantially the same as those of the polymer described in Example 2.

There are thus obtained polymers having the same properties by utilizing, instead of ruthenium chloride, the chlorides of iridium, rhodium, platinum (in the form of $PtCl_4$ or $PtCl_2$), palladium or osmium, the nitrate and acetyl-acetonate of ruthenium.

*Example 7.*—With the exclusion of air and humidity, there is added in an ampulla 5 ml. of a solution of tungsten hexachloride in toluene at $2.52 \times 10^{-2}$ mols per litre, and 1.54 ml. of a solution in toluene of aluminum-trihexyl at $4.9 \times 10^{-1}$ mols per litre. These are left in contact for 15 minutes at ambient temperature, after which there are added 2 grams of DMON at a purity of 99%. This is sealed under vacuum and held at 70° C. in a thermostat for 16 hours. There is obtained, with a quantitative yield a polymer having a glass transition point of 160° C. and a melting point of 360° C. The applications of this product are the same as those of the product of Example 2.

*Example 8.*—There is employed as a catalyst a mixture of titanium chloride and aluminum trialkyl. There is poured into an ampulla 1 ml. of solution of titanium tetrachloride at 0.1 mol per litre in Decalin, 1 ml. of solution in Decalin of alkyl aluminum of pre-determined concentration. After waiting for 15 minutes, there is added 5 ml. of a solution at 2 mols per litre of DMON at 98.5% purity in Decalin, all these operations being carried out in an atmosphere of dry nitrogen. The ampulla is sealed under vacuum and then the ampullae immersed in a fixed-temperature thermostat (at between 50 and 150° C.) for a pre-determined time.

After polymerization, the polymer is ground by means of a turbo-grinder in 150 ml. of methanol containing 1 ml. of concentrated hydrochloric acid, the mixture is filtered and the product is weighed after drying.

The results obtained are summarized in the following table.

| | Alkyl of aluminum-trialkyl | Polymerization temperature, °C. | Time of polymerization, h. | Ratio [Ti]/([Ti]+[Al]) | Yield, percent |
|---|---|---|---|---|---|
| Test No.: | | | | | |
| 1 | Hexyle | 50 | 70 | 0.166 | 11 |
| 2 | Hexyle | 75 | 24 | 0.166 | 8 |
| 3 | Hexyle | 100 | 4 | 0.166 | 11 |
| 4 | Hexyle | 125 | 3 | 0.166 | 26 |
| 5 | Hexyle | 150 | 1 | 0.166 | 22 |
| 6 | Hexyle | 125 | 5 | 0.118 | 22 |
| 7 | Hexyle | 125 | 5 | 0.154 | 31 |
| 8 | Hexyle | 125 | 5 | 0.200 | 39 |
| 9 | Hexyle | 125 | 5 | 0.22 | 32 |
| 10 | Isobutyle | 125 | 5 | 0.118 | 31 |
| 11 | do | 125 | 5 | 0.154 | 41 |
| 12 | do | 125 | 5 | 0.200 | 50 |
| 13 | do | 125 | 5 | 0.22 | 42 |
| 14 | Ethyle | 125 | 5 | 0.118 | 3.8 |
| 15 | do | 125 | 5 | 0.154 | 8 |
| 16 | do | 125 | 5 | 0.182 | 9.4 |
| 17 | do | 125 | 5 | 0.22 | 10 |
| 18 | Hexyle | 125 | 0.5 | 0.166 | 23 |
| 19 | do | 125 | 1 | 0.166 | 27 |
| 20 | do | 125 | 2 | 0.166 | 31 |
| 21 | do | 125 | 4 | 0.166 | 33 |
| 22 | do | 125 | 20 | 0.166 | 35 |

It is found that, generally speaking, for a given alkyl in the aluminum trialkyl, the yield increases with time, at least up to a certain value of time, and with the temperature. The catalysts containing isobutyl radicals are more active than those containing hexyl radicals, which are in turn more active than the catalysts with a base of triethyl-aluminum. The best results are obtained for a ratio [Ti]/([Ti]+[Al]) of 0.2, which corresponds to a catalyst having the formula $TiCl_4 4Al(alkyl)_3$.

The polymers thus obtained are at least partly crystalline. The melting temperature of the crystalline portion is of the order of 370–390° C. and the glass transition temperature of the amorphous portion is at about 145–160° C. The crystallinity increases with the reaction temperature.

*Example 9.*—Into an ampulla, there is introduced $4 \times 10^{-3}$ mol of an dioxo-molybdenum acetyl-acetonate powder and $24 \times 10^{-3}$ mol of aluminum trihexyl in solution in Decalin. After 15 minutes, there is added 5 ml. of a solution at 2 mols per litre of DMON at 99% purity in Decalin. The product is degasified, the ampulla is sealed and held for 15 hours at 120° C., and its contents is then washed with methanol containing 1% of ammonia.

There is obtained with a yield of 33%, a polymer having a glass transition temperature of 177° C.; no melting point can be found by differential thermal analysis. Its molecular mass, determined by light scattering is $3.5 \times 10^4$. The end uses of the product of this example are the same as those of the product of Example 2.

*Example 10.*—Into an ampulla there is introduced $10^{-4}$ mol of a powder of vanadyl acetyl-acetonate freshly sublimed, 2.6 mol of toluene, 2 grams of DMON at 99% purity and 1.4 ml. of a solution at $5 \times 10^{-2}$ mol per litre of aluminum-trihexyl in toluene.

The contents of the ampulla is then frozen by plunging the latter into liquid nitrogen; it is put under vacuum by means of a vane pump, is then sealed and plunged into a bath the temperature of which is regulated by thermostat to 120° C. and it is maintained at this temperature for 18 hours. At the end of this period, the ampulla is broken and its contents is washed with ethanol containing 1% of hydrochloric acid.

There is obtained with a yield of 50%, a polymer having a glass transition temperature of 180° C. and having no melting point which can be observed by differential thermal analysis.

*Example 11.*—The operation is carried out as in Example 9, the aluminum-trihexyl being replaced by a solution of butyl-lithium in hexane, the ratio [Li]/[Mo] being 8. There is obtained a polymer which does not have any glass transition temperature discoverable by differential thermal analysis and which has a melting point of 365° C.

*Example 12.*—With the exclusion of air, there are added to an ampulla 18 mg. of dioxo-molybdenum acetyl-acetonate ($5.3 \times 10^{-5}$ mol), 16.7 mg. of aluminum chloride ($12.5 \times 10^{-5}$ mol), 5 ml. of dry toluene, 2 grams of DMON ($1.25 \times 10^{-2}$ mol) at 99% purity, and 0.5 ml. of a solution at 0.5 mol per litre of aluminum trihexyl in Decalin ($25 \times 10^{-5}$ mol). The mixture is degasified by repeated congelation and melting under vacuum, the ampulla is sealed and maintained at 70° C. for 16 hours. After this time, it is broken and its contents washed with methanol containing 1% of concentrated ammonia; this washing is effected under stirring in a turbo-grinder. The yield is practically quantitative.

The product obtained is then treated for 24 hours in boiling xylene (138° C.). After this time, 20% by weight of insoluble products are separated. The supernatant solution is poured into the methanol, and there is collected, with a yield of 80%, a polymer having a glass transition temperature of 200° C. and having no visible melting point.

*Example 13.*—The operations are carried out as in Example 8, the catalyst being constituted by a solution of molybdenum pentachloride in carbon tetrachloride at 3 mg./ml. and aluminum trihexyl in solution in Decalin. The yields are given in the table below.

The samples 2, 5 and 9 are examined by differential thermal analysis. The glass transition temperatures are respectively 185, 150 and 155° C. The samples do not have any melting point detectable by differential thermal analysis.

| | Ratio [Mo]/[monomer] | Ratio [Mo]/([Mo]+[Al]) | Polymerization temperature (in °C.) | Duration (in hours) | Yield (in percent) |
|---|---|---|---|---|---|
| Test No.: | | | | | |
| 1 | $10^{-2}$ | 0.2 | 25 | 17 | 22 |
| 2 | $10^{-2}$ | 0.4 | 25 | 17 | 22.8 |
| 3 | $10^{-2}$ | 0.5 | 25 | 17 | 20.5 |
| 4 | $10^{-2}$ | 0.8 | 25 | 17 | 4 |
| 5 | $10^{-2}$ | 0.4 | 100 | 0.1 | 75 |
| 6 | $10^{-2}$ | 0.4 | 100 | 0.3 | 100 |
| 7 | $10^{-2}$ | 0.4 | 100 | 1 | 100 |
| 8 | $10^{-2}$ | 0.4 | 100 | 2 | 100 |
| 9 | $10^{-2}$ | 0.4 | 100 | 4 | 100 |
| 10 | $10^{-2}$ | 0.4 | 50 | 0.3 | 57 |
| 11 | $10^{-2}$ | 0.4 | 50 | 1 | 87 |
| 12 | $10^{-2}$ | 0.4 | 50 | 2 | 84 |
| 13 | $10^{-2}$ | 0.4 | 50 | 4 | 100 |
| 14 | $10^{-2}$ | 0.4 | 50 | 2 | 80 |
| 15 | $6.10^{-3}$ | 0.4 | 50 | 2 | 60 |

Polymethyl-dimethano-octahydro-naphthalene (Polymethyl-DMON) having units of formula:

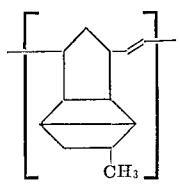

The polymerization of methyl-DMON can be effected under the same conditions as that of DMON, and gives polymers having properties very close to those of the poly-DMONs. Their applications are the same.

*Example 14.*—10 grams of methyl-DMON of 92.2% purity are dissolved in 25 ml. of n-butanol. There is added 1.5 ml. of a butanol solution at $10^{-2}$ mol per litre of hydrated ruthenium chloride. Degasification is effected by alternate melting and congelation under vacuum, the vessel is sealed and held for 3 hours in a thermostat at 90° C. The polymer obtained is ground by means of a turbo-grinder to a fine powder which is washed with methanol. After drying, 6.65 grams of polymer are obtained. The molecular mass of this polymer, determined by light scattering is $1.3 \times 10^5$, its intrinsic viscosity at 25° C. in toluene is 0.76 dl. g.$^{-1}$. The polymer has a glass transition temperature of 195° C. It is moulded by compression at 255° C. to form a colourless transparent plate of 1 mm. in thickness, on which the following mechanical properties are determined:

|  | Modulus (kg./mm.$^2$) | Tensile strength at break (kg./mm.$^2$) |
|---|---|---|
| At 22° C | 157 | 8.2 |
| At 60° C | 120 | 6.4 |
| At 100° C | 110 | 4.8 |
| At 140° C | 88 | 3.4 |
| At 160° C | 70 | 2 |
| At 180° C | 6.7 | 0.43 |

The infra-red spectrum particularly shows bands towards 1480 and 1450 cm.$^{-1}$ (doublet), towards 1375 cm.$^{-1}$, towards 970 cm.$^{-1}$ together with a less intense band towards 750 cm.$^{-1}$, thus enabling the structural formula of the unit to be established.

*Example 15.*—The operation is carried out as in Example 14, but with methyl-DMON purified by preparative chromatography, the purity of which is 99.9% and which contains as the main impurity 0.004% of cyclopentadiene and no dicyclo-pentadiene detectable by gas-liquid chromatography. Under these conditions, there are obtained from 1.761 grams of monomer 1.574 grams of polymer of molecular mass, determined by light scattering of $1.2 \times 10^5$.

*Example 16.*—The same monomer is used for starting as in Example 15, and the operation is carried out as in the previous example, but the polymerization is carried out at 100° C. instead of 90° C. Under these conditions, 0.829 gram of polymer is obtained from 0.886 gram of monomer. The molecular mass of this polymer is $6 \times 10^5$.

*Example 17.*—There are polymerized 5 ml. of a solution at 2 mols per litre of methyl-DMON (99% purity) in Decalin, with a mixture of 1 ml. of titanium tetrachloride at 0.1 mol per litre in Decalin and 1 ml. of solution of aluminum-trihexyl in Decalin, the ratio:

$$\frac{[Ti]}{[Ti]+[Al]}$$

being 0.166 and the method of operation being identical with that of Example 8. The products are partly crystalline. The following results are obtained:

| | Polymerization temperature | | | | | | | |
|---|---|---|---|---|---|---|---|---|
| | 100° C. | | 125° C. | | | 150° C. | | |
| Duration, hours | 7 | 11 | 2 | 3 | 11 | 24 | 1 | 5 | 44 |
| Yield, percent | 0.4 | 1.8 | 2 | 1.5 | 4.8 | 6.5 | 3.2 | 7 | 19.5 |

Poly-n-butyl-dimethanooctahydronaphthalene (polybutyl-DMON)

*Example 18.*—Into an ampulla there are introduced 0.60 gram of pure butyl-DMON, 1.25 ml. of butanol and 1.25 ml. of a solution of ruthenium chloride at $10^{-2}$ mol per litre in butanol. After degasifying, the ampulla is sealed and polymerization is carried out for 3 hours at 100° C. The formation of a precipitate is observed. The polymer obtained is washed with methanol and dried until a constant weight is obtained. There is obtained 0.30 gram of polymer (yield 50%), of which the infra-red spectrum confirms the structure and which, by differential thermal analysis, shows a glass transition temperature of $+160°$ C.

Poly-isobutyl-dimethanooctahydronaphthalene (Poly-isobutyl-DMON)

*Example 19.*—Into an ampulla there are introduced 0.60 gram of purified isobutyl-DMON, 1.25 ml. of butanol and 1.25 ml. of a solution of ruthenium chloride in butanol at $10^{-2}$ mol per litre. After degasifying, the ampula is sealed and heated for 3 hours at 100° C. The formation of a precipitate is observed. The polymer obtained is washed with methanol and is dried until a constant weight is obtained. There is produced 0.03 gram of polymer (yield 5%), the infra-red spectrum of which confirms the structure and which, by differential thermal analysis, shows a glass transition temperature of $+160°$ C.

Co-polymers DMON-norbornene

*Example 20.*—Solutions are prepared of a determined mixture of DMON and bicyclo[2.2.1]-hept-2-ene (norbornene) in butanol. The polymerization is effected in the presence of a solution of hydrated ruthenium chloride at $10^{-2}$ mol per litre in the butanol. The polymerization is effected in the presence of a solution of hydrated ruthenium chloride at $10^{-2}$ mol per litre in butanol, the method of operation being as follows:

Into an ampulla there are poured 5 ml. of the solution of the mixture of monomers and 2 ml. of the solution of catalyst, degasification is effected by repeated melting and congelation under vacuum, the ampulla is sealed and the polymerization is effected in a thermostat at 90° C. The polymer obtained is washed with methanol by means of a turbo-grinder and is then dried. There is obtained a white powder which is readily mouldable. The infra-red spectrum and a differential thermal analysis show that the substance is composed of entirely amorphous co-polymers of DMON-norbornene.

| Test No. | Weight of DMON in 5 ml. of solution (in grams) | Weight of norbornene in 5 ml. of solution (in grams) | Duration of polymerization (in hours) | Weight of copolymer obtained (in grams) | Yield in copolymer (in percent) | Glass transition temperature of copolymer (in ° C.) |
|---|---|---|---|---|---|---|
| 1 | 1.42 | 0.94 | 2 | 2.28 | 96.6 | |
| 2 | 1.42 | 0.94 | 3 | 2.36 | 100 | 109 |
| 3 | 0.92 | 1.5 | 2 | 2.42 | 100 | |
| 4 | 0.92 | 1.5 | 3 | 2.40 | 99 | 71 |
| 5 | 2.26 | 0.376 | 2 | 2.50 | 95 | |
| 6 | 2.26 | 0.376 | 3 | 2.52 | 95.8 | 167 |
| 7 | 0.64 | 1.504 | 1 | 2.13 | 99.3 | |
| 8 | 0.64 | 1.504 | 3 | 2.14 | 100 | 61 |

Co-polymers of DMON-5-methylbicyclo[2.2.1]hept-2-ene

*Example 21.*—To a solution of 2 grams of methylbicyclo-heptene (purity 99.2%) and 2.1 grams of DMON (purity 99.8%) in 5 ml. of butanol, there is added 2 ml. of a solution at $10^{-2}$ mol per litre of hydrated ruthenium chloride in butanol, degasification is effected by repeated congelation and melting under vacuum, the vessel is sealed and heated for 3 hours at 90° C. After grinding, washing with methanol and drying, there are obtained 3.4 grams of a powdered copolymer, the infra-red spectrum of which shows the bands of each of the homopolymers and in addition two bands at 695 and 715 cm.$^{-1}$. This polymer is amorphous and has a glass transition temperature of 100° C. According to the estimation by infra-red spectrography of the characteristic band of the methyl group, estimation having a precision of a few percent, it contains 50% by weight of units derivating from methyl-bicyclo-heptene.

*Example 22.*—The same operation is followed as in the previous example, while utilizing 1.9 grams of methyl-bicyclo-heptene (purity 99.5%) and 3.1 grams of DMON (purity 98.71%). There are obtained 5 grams of an amorphous co-polymer containing, according to the infra-red analysis, 45% of units derivating from methyl-bicyclo-heptene and having a glass transition temperature of 103° C.

*Example 23.*—The monomers of the previous example are polymerized by employing 1.2 grams of methyl-bicyclo-heptene and 3.8 grams of DMON. There are obtained 5 grams of copolymer containing, following the infra-red analysis, 27% of units derivating from methyl-bicyclo-heptene and having a glass transition temperature of 120° C.

*Example 24.*—0.6 gram of methyl-bicyclo-heptene and 4.4 grams of DMON are polymerized. There are obtained 4 grams of copolymer containing 15% of units derivating from methyl-bicyclo-heptene and having a glass transition temperature of 165° C. When moulded by compression at 250° C. at a pressure of 200 bars, this copolymer has a modulus of 246 kg./mm.$^2$, an elongation to break of 1.6% and a tensile strength at break of 3 kg./mm.$^2$.

*Example 25.*—There are employed 2.5 grams of methyl-bicyclo-heptene (purity 95%) and 7.5 grams of DMON (purity 99.79%). There are obtained 10 grams of a polymer containing, according to the infra-red analysis, 25% of units derivating from methyl-bicyclo-heptene and having a glass transition temperature of 140–145° C. When moulded by compression, this copolymer has a modulus of 148 kg./mm.$^2$, a reversible elongation of 4.6%, an elongation to break of 50% and a tensile strength at break of 7 kg./mm.$^2$.

*Example 26.*—The operation is effected with 1.2 grams of methyl-bicyclo-heptene (purity 95%) and 8.8 grams of DMON (purity 99.79%). There are obtained 8.3 grams of copolymer containing, according to the infra-red analysis, 6% of units derivating from methyl-bicyclo-heptene, and having a glass transition temperature of 180° C. When moulded as in the previous examples, it has a modulus of 186 kg./mm.$^2$, an elongation to break of 3.3% and a tensile strength at break of 5.2 kg./mm.$^2$.

*Example 27.*—Into a reactor there are introduced under nitrogen 20 ml. of a solution of titanium tetrachloride at 0.1 mol per litre in Decalin, and the 20 ml. of a solution of aluminum tri-isobutyl at 0.5 mol per litre in Decalin. This is stirred for 15 minutes and then there are introduced 16 grams of DMON and 10.8 grams of methyl-bicyclo-heptene in solution in 100 ml. of Decalin. This is heated for 3 hours at 90° C. while stirring, adding the Decalin at regular intervals. After polymerization, the polymer is washed with methanol by means of a turbo-grinder and is then dried. There is obtained, with a yield of 46.6%, an amorphous copolymer having a glass transition temperature of 103° C. An estimation of infra-red spectrography shows that it contains 35% by weight of units derivating from methyl-bicyclo-heptene. After moulding by compression at 200° C. at a pressure of 200 kg./mm.$^2$, this polymer has a modulus of 165 kg./mm.$^2$, an elongation to break of 4.5% and a tensile strength at break of 6.4 kg./mm.$^2$.

*Example 28.*—The operation is followed with the same proportions of reactants as in the preceding example, but in sealed ampullae, following the method of operation of Example 8, the polymerization taking place at 100° C. for 3 hours. The following results are obtained:

| Percentage by weight of 5-methyl-bicyclo[2.2.1]-hept-2-ene in the initial mixture: | Yield |
|---|---|
| 7 | 50.5 |
| 14.4 | 54.6 |
| 31.8 | 59.5 |
| 40 | 70 |

| Percentage by weight of units derivating from 5-methyl-bicyclo[2.2.1]-hept-2-ene in the polymer, glass transition temperature: | ° C. |
|---|---|
| 13 | 140–150 |
| 18 | 140–150 |
| 45 | 105 |
| 62.5 | 80 |

The first two polymers have a low amount of crystallinity and have a melting point at 370–375° C. The other two co-polymers do not show any melting point detectable by differential thermal analysis.

Co-polymers of methyl-DMON norbornene

*Example 29.*—To 10 ml. of a solution of 2 grams of norbornene (purity 99%) and 8.40 grams of methyl-DMON (purity 97.9%) in butanol, there are added 4 ml. of a butanol solution at $10^{-2}$ mol per litre of hydrated ruthenium chloride. Degasifying is effected by repeated congelation and melting under vacuum, and the ampulla is sealed and maintained at 90° C. for 3 hours. The mixture is poured into methanol to precipitate the polymer, ground by means of a turbo-grinder, washed and dried. There are thus obtained 1.10 grams of a co-polymer, the infra-red spectrum of which shows the bands of each of the homopolymers and in addition two bands at 695 and at 720 cm.$^{-1}$. According to estimation by infra-red spectrography on the band of the methyl group, it contains 83% by weight of units derivating from methyl-DMON. This co-polymer has a glass transition temperature of 110° C.

*Example 30.*—The operation is carried out as in the preceding example, but utilizing 1 gram of norbornene and 9 grams of methyl-DMON. There are obtained 1.56 grams of a co-polymer containing 87% of units derivating from methyl-DMON and having a glass transition temperature of 140° C.

*Example 31.*—The operation is effected as in Example 29, employing 0.82 gram of norbornene (purity 99%) and 3.31 grams of methyl-DMON (purity 99.2%). After washing with methanol and drying, there are obtained 3.08 grams of a co-polymer containing 85% of units derivating from methyl-DMON and having a glass transition temperature of 157° C.

*Example 32.*—Into a reactor provided with a turbo-stirrer containing 10 grams of norbornene (purity 99.5%) and 90 grams of methyl-DMON (purity 98.5%) in 0.806 litre of butanol, there are added 94 ml. of a solution at $10^{-2}$ mol per litre of hydrated ruthenium chloride in butanol. After 4 hours at 90° C. while stirring there are obtained, after washing and drying, 34 grams of powdered co-polymer containing 80% of units derivating from methyl-DMON and having a glass transition temperature of 157° C. After moulding by compression at 230° C. under 250 bars, its mechanical properties are determined: modulus 160 kg./mm.$^2$, elongation to break 5.9%, tensile strength at break 7.4 kg./mm.$^2$.

Co-polymer of methyl-DMON 5-methyl-bicyclo[2.2.1]-hept-2-ene

*Example 33.*—To 10 ml. of a solution of 1.8 grams of methyl-bicyclo-heptene and 8.50 grams of methyl-DMON in butanol, there is added 4 ml. of butanol solution at $10^{-2}$ mol per litre of hydrated ruthenium chloride. The mixture is degasified by repeated congelation and melting under vacuum and the ampulla is sealed and maintained at 90° C. for 3 hours. The mixture is poured into methanol to precipitate the polymer, is ground by means of a turbo-grinder, washed and dried. There are thus obtained 1.30 grams of co-polymer having a glass transition temperature of 118° C.

Co-polymer of methyl-DMON-styrene

*Example 34.*—The operation is carried out as in Example 8 by using 1 ml. of a solution of titanium tetrachloride at 0.1 mol per litre in Decalin, 1 ml. of a solution of aluminum trihexyl at 0.5 mol per litre in Decalin, and 5 ml. of a solution containing 0.87 gram of methyl-DMON and 0.52 gram of styrene in Decalin. After heating to 125° C. for 21 hours there is obtained 0.34 gram of a co-polymer which does not show in differential thermal analysis, the glass transition temperatures of the amorphous homopolymers. According to an estimation of the methyl group by infra-red spectrography, it contains 20% by weight of units derivating from methyl-DMON.

Co-polymer of DMON-styrene

*Example 35.*—The operation is carried out as in the previous example, utilizing 0.8 gram of DMON and 0.52 gram of styrene. There is obtained, with a yield of 28%, a co-polymer which does not show in differential thermal analysis the glass transition temperatures of the amorphous homopolymers. According to the estimation by infra-red spectrography based on the characteristic band of the DMON at 880 cm.$^{-1}$, it contains 10% of units derivating from DMON.

Co-polymer of DMON-acenaphthylene

*Example 36.*— Under an atmosphere of dry nitrogen, there is poured into an ampulla 1 ml. of a solution of titanium tetrachloride at 0.1 mol per litre in Decalin and 0.5 ml. of a solution of aluminum trihexyl at 1 mol per litre in Decalin. The solutions are left in contact for 16 minutes at ambient temperature before adding 10 ml. of a mixture containing $x$ ml. of a molar solution of acenaphthylene in Decalin and $10 - x$ ml. of a molar solution of DMON in Decalin. The ampullae are sealed, and after heating for 16½ hours in a thermostat at 125° C., the products are treated as in Example 8. The results are given in the following table:

|  | 2 | 4 | 5 | 6 |
|---|---|---|---|---|
| Yield | 9.5 | 15.8 | 20 | 23 |
| Content by weight of DMON, percent | 38 | 13 | 7.5 | 4 |
| Glass transition temperature, in ° C | 159 | 195 | 197 | 220 |

The contents of the polymer in DMON are determined by estimation of the band at 1460 cm.$^{-1}$ after calibration of the DMON-acenaphthylene mixtures.

Co-polymer of DMON-methyl DMON

*Example 37.*—In a reactor there are introduced under nitrogen 20 ml. of a solution of titanium tetrachloride at 0.1 mole per litre in Decalin, then 20 ml. of a solution of aluminum tri-isobutyl at 0.5 mol per litre in Decalin. This is stirred for 15 minutes, after which there are added 16 grams of DMON and 17.4 grams of methyl-DMON in 50 ml. of Decalin. The mixture is heated for 3 hours at 90° C. while adding twice 50 ml. of Decalin; the polymer is ground with a turbo-grinder in ethanol and washed in ethanol. After drying, there are obtained 20.4 grams of a partially crystalline co-polymer containing 40% of units derivating from methyl-DMON according to estimation by infra-red spectrography on the methyl group.

This polymer has a glass transition temperature of 175–180° C. and a melting point over the range 320–340° C.

Co-polymer of DMON-cyclopentene

*Example 38.*—An ampulla provided with a rubber diaphragm in a bath held at −30° C. is freed from air and humidity by sweeping out with dry nitrogen. There are introduced into it, by means of a syringe and in the following order:

9 ml. of a solution of DMON in toluene at 3 mols per litre;

1 ml. of a solution of cyclopentene in toluene at 3 mols per litre;

3.1 ml. of a solution of benzoyl peroxide in toluene at $3.87 \times 10^{-2}$ mol per litre;

1.56 ml. of a solution in toluene of tungsten hexachloride at $3.84 \times 10^{-2}$ mol per litre; and 0.60 ml. of a solution of aluminum-trihexyl in toluene at 0.492 mol per litre.

The mixture is stirred vigorously as soon as the last reactant has been introduced, and then the polymerization is left to continue for 1 hour at −30° C. The ampulla is then broken and its contents ground in a turbo-grinder in the presence of 100 ml. of ethanol containing 250 mg. of potash and 200 mg. of Nonox WSP (phenol anti-oxidizing agent, produced by Imperial Chemical Industries Limited).

The precipitated polymer is collected by filtration and dried under vacuum at ambient temperature.

There is obtained 0.792 gram (yield 17.5%) of a co-polymer, the glass transition temperature of which is 155° C. and which has no crystallinity.

*Example 39.*—By operating under the same conditions as in Example 38 with the following quantities of reactants in solution in toluene:

9 ml. of DMON at 3 mols per litre;
1 ml. of cyclopentene at 3 mols per litre;
1.56 ml. of tungsten hexachloride at $3.84 \times 10^{-2}$ mol per litre;
0.36 ml. of aluminum-trihexyl at 0.493 mol per litre, there are obtained 1.6 grams (yield 34.5%) of a co-polymer having a glass transition temperature of 170° C. and which does not have any crystallinity.

It will be understood that the present invention has been described only by way of explanation and not in any limitative sense, and that any useful modification may be made thereto without thereby departing from its scope.

We claim:

1. Macromolecular plastomer polymers having a plurality of repeating monomeric units and a molecular weight of at least about 35,000, comprising at least one unit in the polymer backbone having the formula:

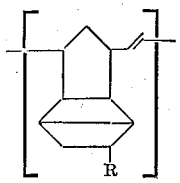

in which R is selected from the group consisting of hydrogen and the lower alkyl radicals.

2. Plastomer polymers in accordance with claim 1 obtained by the polymerization of monomers selected from the group consisting of dimethanooctahydronaphthalene and its lower alkyl-substituted derivatives.

3. Plastomer polymers in accordance with claim 1 in which said plastomer polymers are amorphous.

4. Amorphous plastomer polymers in accordance with claim 3 in which said polymers are homopolymers, and having a glass transition temperature higher than 150° C.

5. Amorphous plastomer homopolymers in accordance with claim 4 having an impact resistance which is substantialy constant between —200° C. and +100° C.

6. Polymers in accordance with claim 1 in which said polymers are at least partly crystalline.

7. Plastomer polymers in accordance with claim 1 comprising from 1 to 99% by weight of said units and from 99 to 1% by weight of units derived from an ethylenically unsaturated carbocyclic comonomer.

8. Plastomer polymers in accordance with claim 7 wherein said ethylenically unsaturated co-polymerizable compound is selected from the group consisting of styrene, acenaphthylene and the cyclic olefins of the group comprising bicyclo[2.2.1]-hept-2-ene, the alkyl-substituted bicyclo[2.2.1]-hept-2-enes and cyclopentene.

9. Amorphous homopolymers in accordance with claim 1 of 1,4,5,8-dimethano-1,2,3,4,4a,5,8,8a-octahydro-naphthalene, having a glass transition temperature higher than 150° C.

10. At least partially crystalline homopolymers in accordance with claim 1 of 1,4,5,8-dimethano-1,2,3,4,4a,5,8,8a-octahydronaphthalene, of which the crystalline portion has a melting point higher than 300° C.

11. Amorphous homopolymers in accordance with claim 1 of 3-methyl-1,4,5,8-dimethano-1,2,3,4,4a,5,8,8a-octahydro-naphthalene having a glass transition temperature higher than 150° C.

12. Partially crystalline homopolymers in accordance with claim 1 of 3-methyl-1,4,5,8-dimethano-1,2,3,4,4a,5,8,8a-octahydro-naphthalene in which the crystalline portion has a melting point higher than 300° C.

13. Amorphous homopolymers in accordance with claim 1 of 3 - butyl-1,4,5,8-dimethano-1,2,3,4,4a,5,8,8a-octahydro-naphthalene having a glass transition temperature higher than 150° C.

14. Amorphous homopolymers in accordance with claim 1 of 3-isobutyl-1,4,5,8-dimethano-1,2,3,4,4a,5,8,8a-octahydro-naphthalene having a glass transition temperature higher than 150° C.

15. Substantially amorphous plastomer co-polymers in accordance with claim 1 of 1,4,5,8-dimethano-1,2,3,4,4a,5,8,8a-octahydro-naphthalene and of bicyclo[2.2.1]-hept-2-ene.

16. Substantially amorphous plastomer co-polymers in accordance with claim 1 of 1,4,5,8-dimethano-1,2,3,4,4a,5,8,8a-octahydro-naphthalene and of 5-methyl-bicyclo[2.2.1]-hept-2-ene.

17. Substantially amorphous plastomer co-polymers in accordance with claim 1 of 3-methyl-1,4,5,8-dimethano-1,2,3,4,4a,5,8,8a - octahydro-naphthalene and of bicyclo[2.2.1]-hept-2-ene.

18. Substantially amorphous plastomer co-polymers in accordance with claim 1 of 3-methyl-1,4,5,8-dimethano-1,2,3,4,4a,5,8,8a-octahydro-naphthalene and of 5-methyl-bicyclo[2.2.1]-hept-2-ene.

19. Substantially amorphous plastomer co-polymers in accordance with claim 1 of 1,4,5,8-dimethano-1,2,3,4,4a, 5,8,8a-octahydro-naphthalene and of styrene.

20. Substantially amorphous plastomer co-polymers in accordance with claim 1 of 3-methyl-1,4,5,8, dimethano-1,2,3,4,4a,5,8,8a-octahydro-naphthalene and of styrene.

21. Substantially amorphous plastomer co-polymers in accordance with claim 1 of 1,4,5,8-dimethano-1,2,3,4,4a, 5,8,8a-octahydro-naphthalene and of acenaphthylene.

22. Substantially amorphous plastomer co-polymers in accordance with claim 1 of 1,4,5,8-dimethano-1,2,3,4,4a, 5,8,8a-octahydro-naphthalene and of cyclopentene.

23. Substantially amorphous plastomer co-polymers in accordance with claim 1 of 1,4,5,8-dimethano-1,2,3,4,4a, 5,8,8a-octahydro-naphthalene and of 3-methyl-1,4,5,8-dimethano-1,2,3,4,4a,5,8,8a-octahydro-naphthalene.

24. Plastomer polymer in accordance with claim 1 having a molecular weight of 35,000 to 2,000,000.

25. A method of preparation of plastomer polymers comprising at least one unit having the formula:

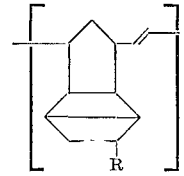

in which R is selected from the group consisting of hydrogen and the lower alkyl radicals, said method comprising the polymerization of at least one monomer selected from the group of dimethano-octahydro-naphthalene and its alkyl derivatives with from 0 to 99% of a compound selected from the group comprising styrene, acenaphthylene and the cyclic olefins of the group comprising bicyclo [2.2.1]-hept-2-ene, the alkyl-substituted bicyclo [2.2.1]-hept-2-enes and cyclo-pentene, in the presence of a catalyst selected from the group consisting of the halides, the nitrates, the acetyl-acetonates of ruthenium, rhodium, palladium, osmium, iridium and platinum, in association with an alcohol; the halides, the acetyl-acetonates of the transition metals of groups IV, V and VI of the Periodic Table, comprising titanium, vanadium, zirconium, tungsten, molybdenum, in association with a compound containing at least one bond selected from the group metal-hydrocarbon and metal-hydrogen.

26. A method as claimed in claim 25, in which the polymerization is effected in the presence of an inert solvent of the monomers, selected from the group of hydrocarbons.

27. A method as claimed in claim 25, in which the catalyst is ruthenium chloride in the presence of butanol.

28. A method as claimed in claim 25, in which the catalyst is selected from the group consisting of the halides, the acetyl-acetonates of metals of the Groups IV, V and VI of the Periodic Table, comprising titanium, vanadium, zirconium, tungsten, molybdenum, in association with an aluminum trialkyl, in the presence of an inert solvent of the monomers selected from the group of hydrocarbons.

29. A method as claimed in claim 25, in which the catalyst is selected from the group of vanadyl-acetyl-acetonates, the dioxo-molybdenum acetyl-acetonates, the molybdenum pentachloride in association with an aluminum-trialkyl in the presence of an inert solvent of the monomers, selected from the group of hydrocarbons.

30. A method as claimed in claim 25, in which the catalyst is selected from the group comprising tungsten hexachloride and titanium tetrachloride in association with an aluminum trialkyl, and from the group of dioxo-molybdenum acetyl-acetonate in association with butyl-lithium in the presence of an inert solvent of the monomers, selected from the group of hydrocarbons.

References Cited

UNITED STATES PATENTS

| | | | |
|---|---|---|---|
| 2,721,189 | 10/1955 | Anderson et al. | 260—93.1 |
| 3,033,835 | 5/1962 | Adamek et al. | 260—79.5 |

JOSEPH L. SCHOFER, Primary Examiner

S. M. LEVIN, Assistant Examiner

U.S. Cl. X.R.

260—93.5, 666